(12) United States Patent
Hou

(10) Patent No.: US 9,561,609 B2
(45) Date of Patent: Feb. 7, 2017

(54) METHOD FOR PRODUCING OPTICAL DEVICE

(71) Applicant: Genius Electronic Optical Co., Ltd., Taichung (TW)

(72) Inventor: Hsien-Chang Hou, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 371 days.

(21) Appl. No.: 14/261,667

(22) Filed: Apr. 25, 2014

(65) Prior Publication Data

US 2015/0102513 A1      Apr. 16, 2015

(30) Foreign Application Priority Data

Oct. 14, 2013    (CN) .......................... 2013 1 0479127

(51) Int. Cl.
- *B29C 45/14* (2006.01)
- *B29C 45/16* (2006.01)
- *B29L 11/00* (2006.01)

(52) U.S. Cl.
CPC .......... *B29C 45/162* (2013.01); *B29L 2011/00* (2013.01)

(58) Field of Classification Search
CPC .. B29L 2011/00; B29C 45/0003; B29C 45/16; B29C 45/162; B29C 2045/167; B29C 45/0062
USPC ........................................ 425/572, 575, 808
See application file for complete search history.

(56) References Cited

U.S. PATENT DOCUMENTS

| | | | | |
|---|---|---|---|---|
| 5,413,743 A | * | 5/1995 | Prophet ............... | B29C 45/0062 264/1.7 |
| 2002/0167167 A1 | * | 11/2002 | Elder .................. | B29C 45/0003 285/261 |
| 2007/0212440 A1 | * | 9/2007 | Iimura ................ | B29C 45/0062 425/517 |
| 2007/0290411 A1 | * | 12/2007 | Suter ................. | B29C 45/14467 264/510 |
| 2008/0079192 A1 | * | 4/2008 | Nishida ............... | B29C 45/0062 264/255 |
| 2008/0138561 A1 | * | 6/2008 | Umezawa ................ | B60Q 1/34 428/61 |
| 2008/0277808 A1 | * | 11/2008 | Clerc ...................... | B29C 45/16 264/1.7 |
| 2009/0045533 A1 | * | 2/2009 | Hsu ....................... | B29C 45/162 264/1.7 |
| 2010/0035333 A1 | * | 2/2010 | Lee .................... | B01L 3/502707 435/287.1 |
| 2010/0236700 A1 | * | 9/2010 | Kaufmann .............. | B29C 44/08 156/245 |

(Continued)

*Primary Examiner* — Alison L Hindenlang
*Assistant Examiner* — Emmanuel S Luk
(74) *Attorney, Agent, or Firm* — Jianq Chyun IP Office

(57) ABSTRACT

A method for producing an optical device includes steps of: providing a first mold set, a second mold set, and an inner mold member cooperating with the first mold set to define a first molding cavity; filling a first plastic material into the first molding cavity so as to form a first molded object including a first molded element; placing the first molded object and the inner mold member into the second mold set to cooperatively define a second molding cavity; filling a second plastic material into the second molding cavity so as to form a second molded object including a second molded element; and disconnecting the first and second molded elements from the first and second molded objects.

9 Claims, 15 Drawing Sheets

(56) References Cited

U.S. PATENT DOCUMENTS

| | | | |
|---|---|---|---|
| 2011/0090570 A1* | 4/2011 | DeCusatis | B29C 37/0067 359/619 |
| 2012/0099980 A1* | 4/2012 | Nishita | B29C 45/0062 415/200 |
| 2012/0293878 A1* | 11/2012 | Mori | B29C 45/0062 359/754 |
| 2013/0101799 A1* | 4/2013 | Trier | B29C 45/1418 428/164 |
| 2013/0115436 A1* | 5/2013 | Hahn | B29C 45/14 428/213 |
| 2013/0154153 A1* | 6/2013 | Jacobson | B29C 45/0003 264/255 |
| 2013/0175720 A1* | 7/2013 | Otsuka | A61B 1/0011 264/1.32 |
| 2013/0307183 A1* | 11/2013 | Rohlje | B29C 45/162 264/255 |
| 2013/0313730 A1* | 11/2013 | Fujii | B29C 45/1671 264/1.7 |
| 2013/0316144 A1* | 11/2013 | Kikuchi | B29D 11/00048 428/161 |
| 2014/0001673 A1* | 1/2014 | Takahashi | B29C 45/0003 264/245 |
| 2015/0277110 A1* | 10/2015 | Oh | G02B 27/0006 359/513 |
| 2015/0352761 A1* | 12/2015 | Okamoto | B29C 45/1615 264/45.2 |
| 2016/0082629 A1* | 3/2016 | Modi | B29C 45/1657 264/28 |

* cited by examiner

METHOD FOR PRODUCING OPTICAL DEVICE

CROSS-REFERENCE TO RELATED APPLICATION

This application claims priority of Chinese Patent Application No. 201310479127.1, filed on Oct. 14, 2013.

BACKGROUND OF THE INVENTION

1. Field of the Invention

The invention relates to a method for producing an optical device.

2. Description of the Related Art

A conventional bi-injection molding process includes the following steps: filling a plastic material into a first mold set to form a first molded object, followed by cutting off unwanted portions (e.g., portions formed in sprue channels) of the first molded object to form a semi-product and placing the semi-product into a second mold set; and filling another plastic material into the second mold set to encapsulate (or to contact) the semi-product, followed by cutting off portions formed in sprue channels of the second mold set so as to obtain the final product. However, the conventional bi-injection molding process has several disadvantages such as:

(i) A cutting/trimming step is needed for each of the semi-product and the final product, thereby increasing the manufacturing time and lowering the manufacturing efficiency.

(ii) The semi-product needs to be precisely placed into the second mold set, and thus, the extra manufacturing time for aligning the semi-product lowers the manufacturing efficiency as well.

SUMMARY OF THE INVENTION

Therefore, the object of the present invention is to provide a method for producing an optical device that may alleviate the aforementioned drawbacks of the prior art.

According to one aspect of the present invention, a method for producing an optical device, includes the following steps:

(a) providing a first mold set, a second mold set, and an inner mold member that is disposed in the first mold set and that cooperates with the first mold set to define a first molding cavity and a first gate spatially communicating with the first molding cavity;

(b) filling a first plastic material into the first molding cavity via the first gate so as to forma first molded object including the first molded element;

(c) placing the first molded object together with the inner mold member into the second mold set, such that the inner mold member, the first molded object, and the second mold set cooperatively define a second molding cavity and a second gate spatially communicating with the second molding cavity;

(d) filling a second plastic material into the second molding cavity via the second gate so as to form a second molded object including a second molded element which is coupled to the first molded element; and (e) disconnecting the first and second molded elements respectively from the first and second molded objects so as to form the optical device.

According to another aspect of the present invention, a method for producing an optical device, includes the following steps of:

(a) providing a first mold set, a second mold set, a third mold set, and an inner mold member that is disposed in the first mold set and that cooperates with the first mold set to define a first molding cavity and a first gate spatially communicating with the first molding cavity;

(b) filling a first plastic material into the first molding cavity via the first gate so as to form a first molded object including a first molded element;

(c) placing the first molded object together with the inner mold member into the second mold set, such that the inner mold member, the first molded object and the second mold set cooperate to define a second molding cavity and a second gate spatially communicating with the second molding cavity;

(d) filling a second plastic material into the second molding cavity via the second gate so as to form the second molded object including a second molded element which is coupled to the first molded element;

(e) placing the inner mold member together with the first molded object and the second molded object into the third mold set, such that the inner mold member, the first and second molded objects, and the third mold set cooperate to define a third molding cavity and a third gate that is in spatial communication with the third molding cavity;

(f) filling a third plastic material into the third molding cavity via the third gate, so as to form a third molded object including a third molded element which is coupled to at least one of the first and second molded elements; and (g) disconnecting the first, second, and third molded elements respectively from the first, second, and third molded objects so as to form the optical device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
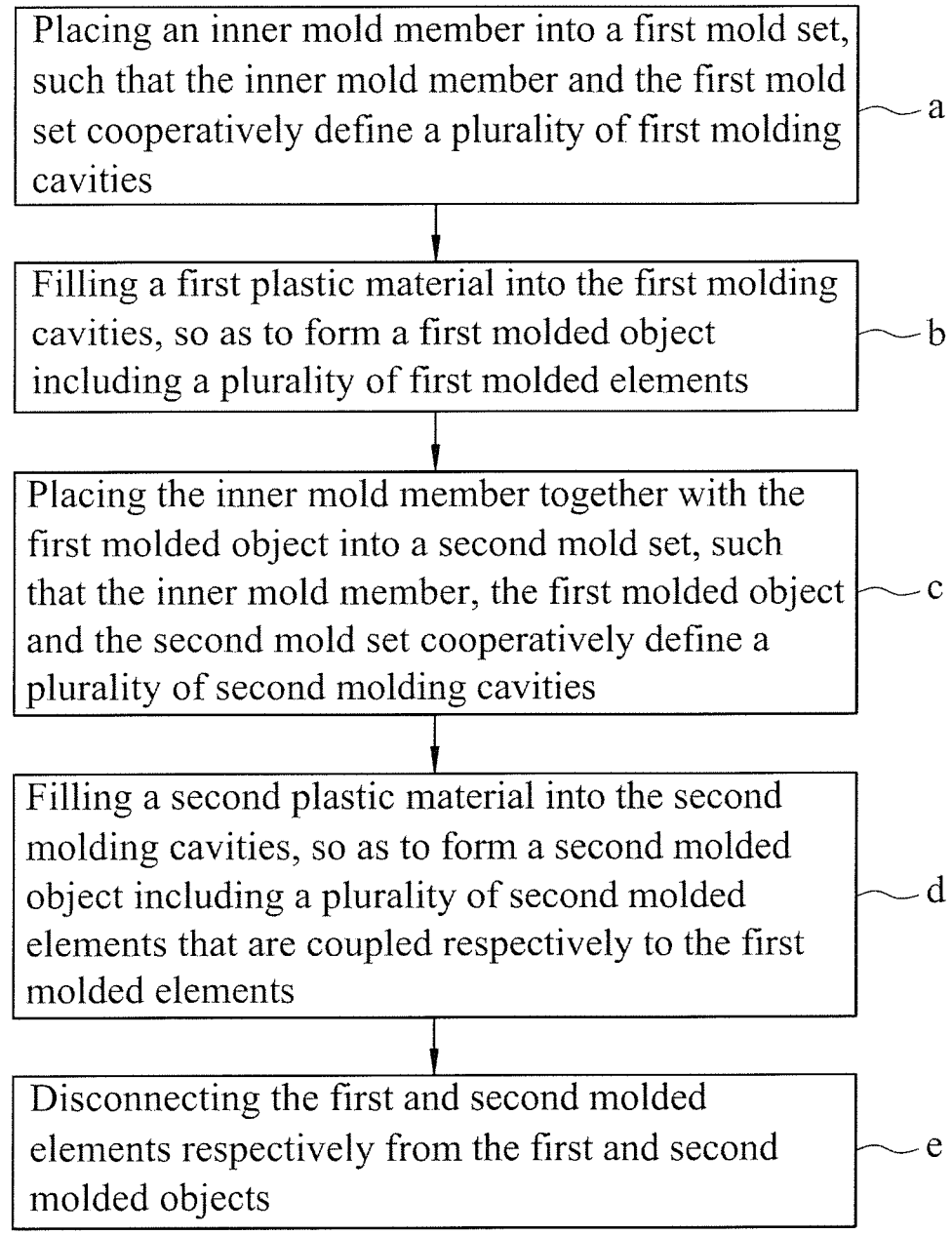
FIG. 1 is a flow chart of a first preferred embodiment of a method for producing an optical device according to the invention.
Figure 2:
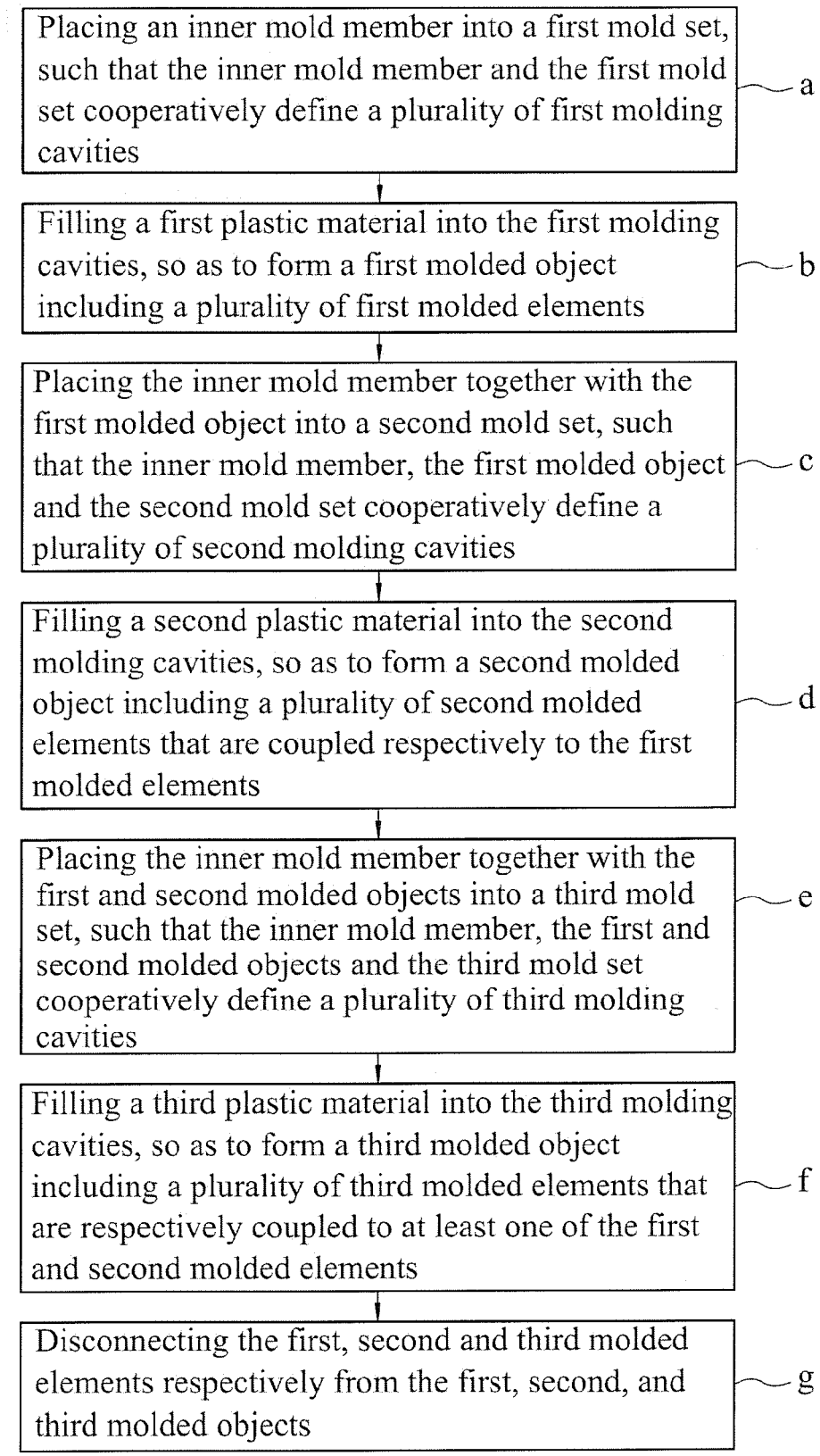
FIG. 2 is a flow chart of a second preferred embodiment of the method according to the present invention.
Figure 3:
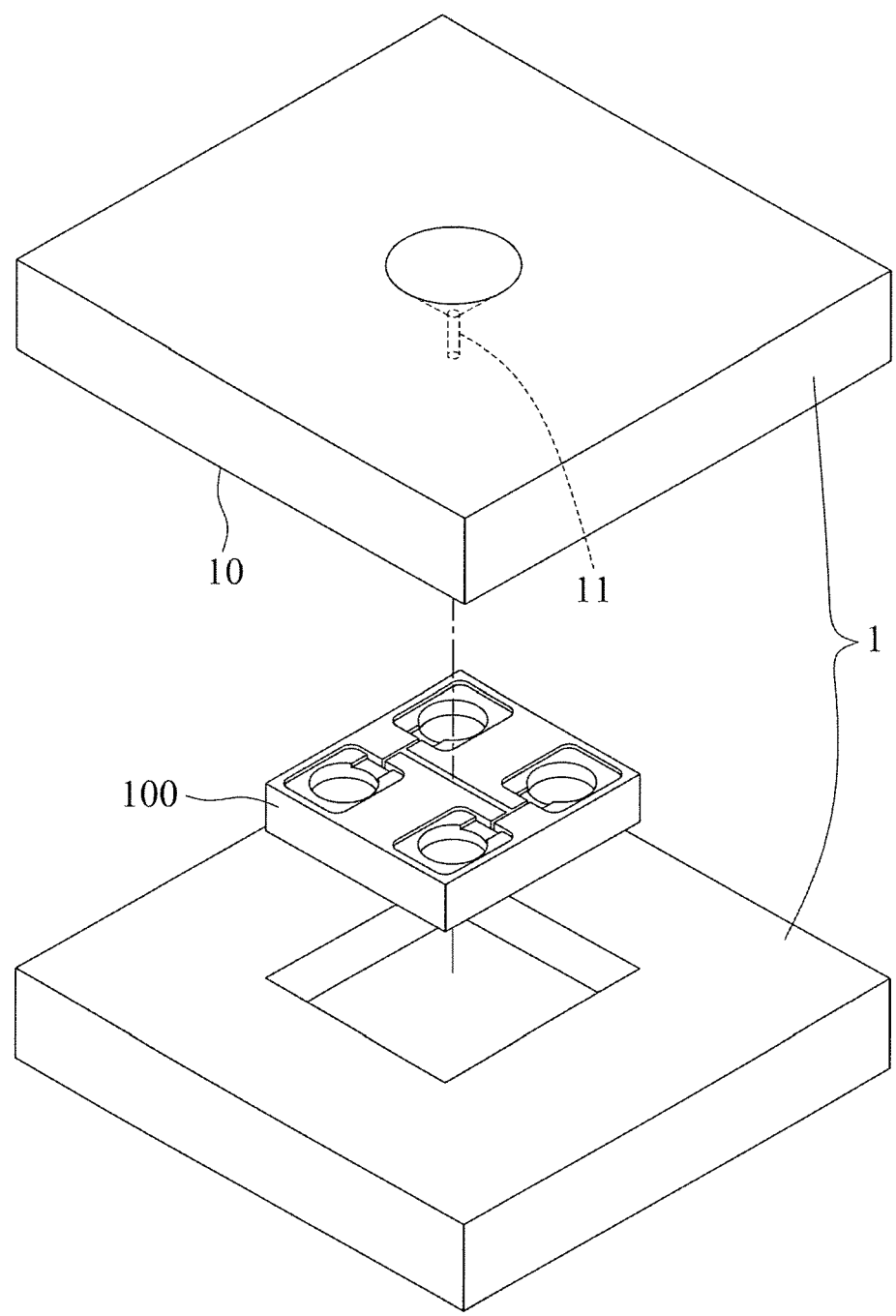
FIG. 3 is an exploded perspective view of the first preferred embodiment, illustrating a first mold set and an inner mold member.
Figure 4:
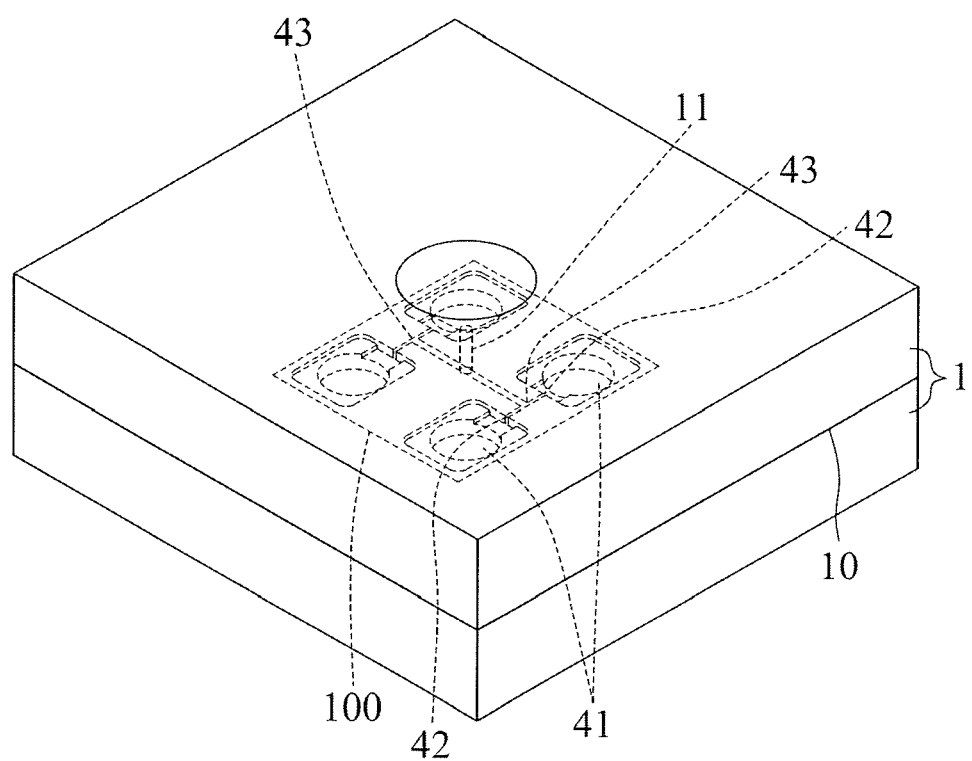
FIG. 4 is a perspective view of the first preferred embodiment, illustrating the inner mold member placed in the first mold set.
Figure 5:
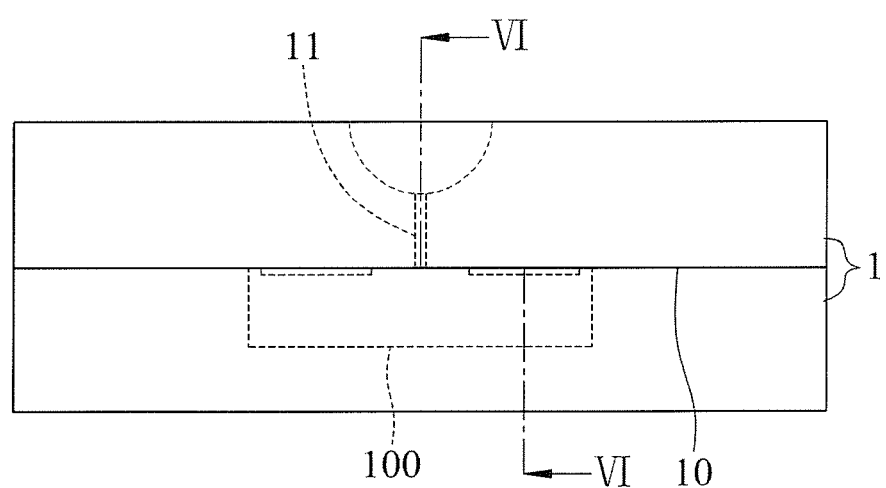
FIG. 5 is a side view of the first preferred embodiment, illustrating the inner mold member placed in the first mold set.
Figure 6:
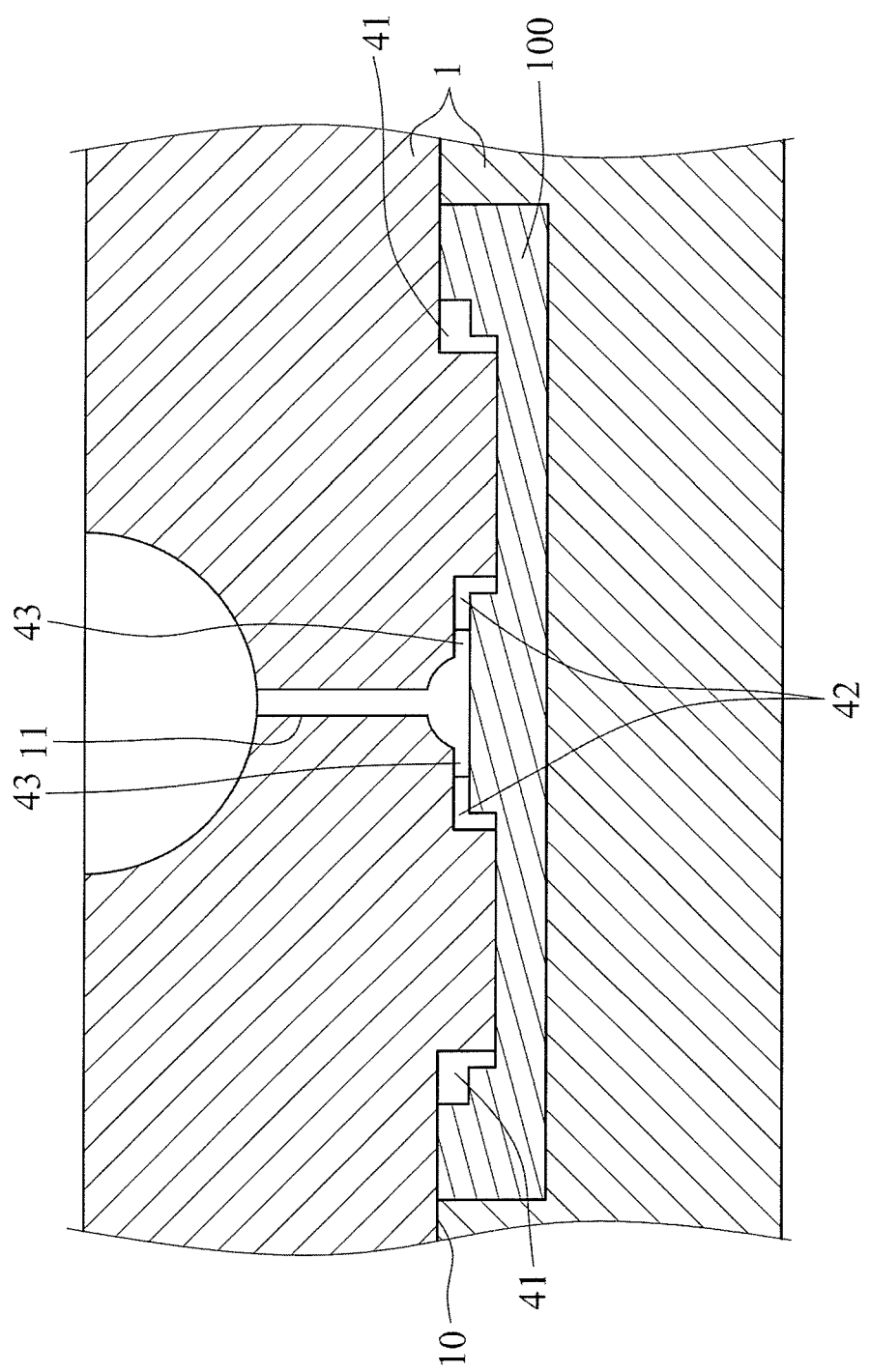
FIG. 6 is a sectional view of the first preferred embodiment taken along line VI-VI of FIG. 5, illustrating the inner mold member cooperating with the first mold set to define a plurality of first molding cavities and a plurality of first gates.

Before the present invention is described in greater detail, it should be noted that like elements are denoted by the same reference numerals throughout the disclosure.

Referring to FIGS. 1 and 3 to 10, the first preferred embodiment of a method for producing an optical device, is shown to include the following steps:

Step (a): providing a first mold set 1 and an inner mold member 100 (see FIGS. 3 to 6). The inner mold member 100 is disposed in the first mold set 1 and cooperates with the first mold set 1 to define a first molding cavity 41 and a first gate 42 spatially communicating with the first molding cavity 41. The first mold set 1 is formed with a first down sprue 11 that extends in a direction perpendicular to a parting plane 10 thereof. The first mold set 1 further cooperates with the inner mold member 100 to define a first sprue channel 43 that spatially interconnects the first down sprue 11 and the first gate 42. In this embodiment, the inner mold member 100 and the first mold set 1 cooperatively define a plurality of the first molding cavities 41, a plurality of the first gates 42 spatially communicating with the first molding cavities 41 respectively, and a plurality of the first sprue channels 43 each of which spatially interconnects the first down sprue 11 and a respective one of the first gates 42. It should be noted that the number of the first molding cavities 41, of the first gates 42, or of the first sprue channels 43 should not be limited thereto according to the present invention.

Figure 7:
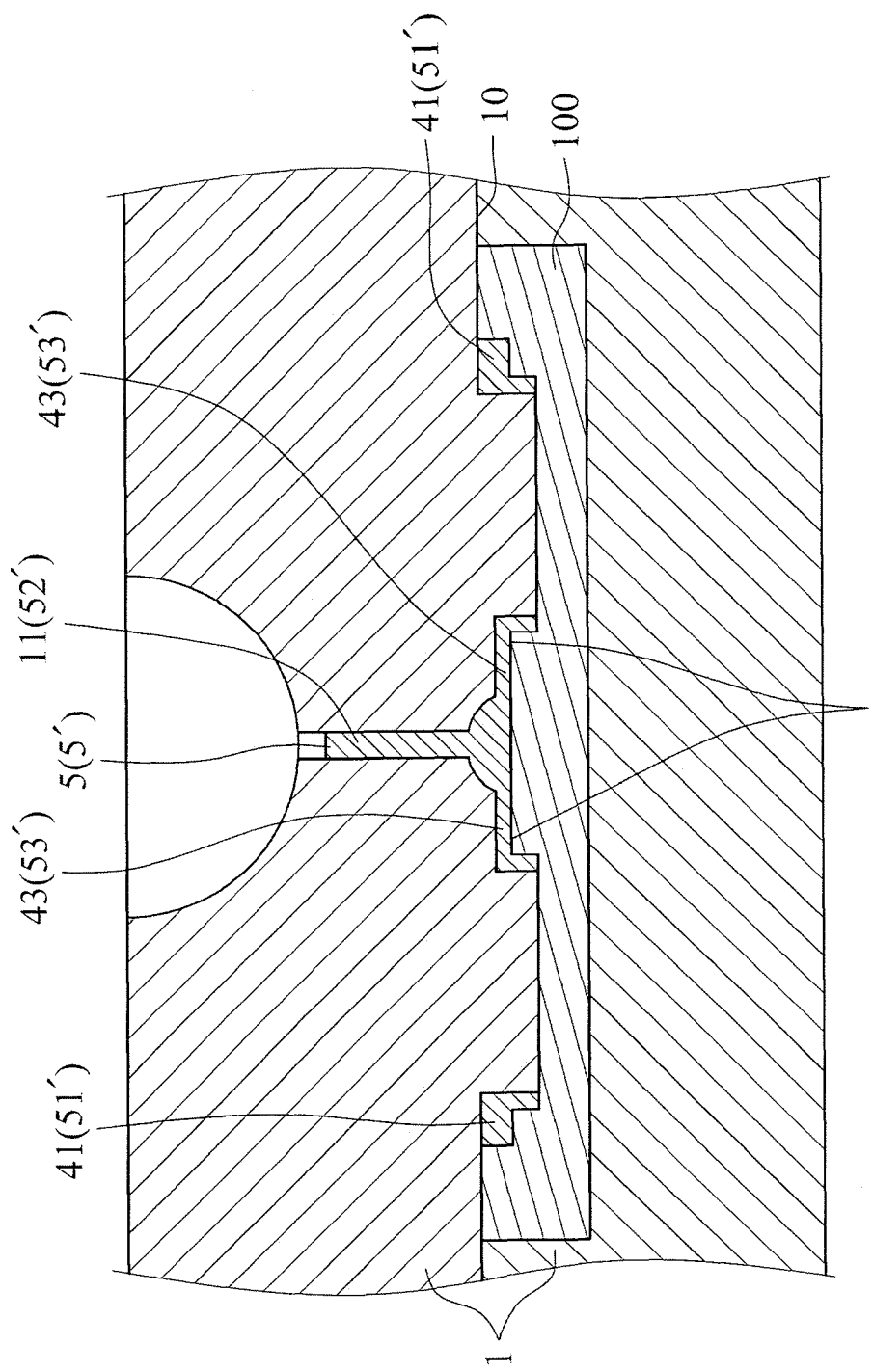
FIG. 7 is a sectional view of the first preferred embodiment, illustrating that a first plastic material filled into the first molding cavities from a first down sprue of the first mold set via the first gates to form a first molded object.

Step (b): filling a first plastic material 5 into the first molding cavities 41 via the first down sprue 11, the first sprue channels 43, and the first gates 42 so as to form a first molded object 5' (see FIG. 7). The first molded object 5' includes a plurality of first molded elements 51' disposed respectively in the first molding cavities 41, a main stem piece 52' formed in the first down sprue 11, and a plurality of branch stem pieces 53' that are connected to the main stem piece 52' and that are formed respectively in the first sprue channels 43.

Step (c): providing a second mold set 2 and placing the inner mold member 100 together with the first molded object 5' into the second mold set 2 (see FIG. 8) The second mold set 2 is formed with a second down sprue 21 extending in a direction perpendicular to a parting plane 20 thereof. The inner mold member 100, the first molded object 5', and the second mold set 2 cooperatively define a plurality of second molding cavities 61 and a plurality of second gates 62 spatially communicating respectively with the second molding cavities 61. In this embodiment, the second mold set 2, the inner mold member 100 and the branch stem pieces 53' cooperate to define a plurality of second sprue channels 63, each which interconnects the second down sprue 21 and a respective one of the second gates 62.

Figure 9:
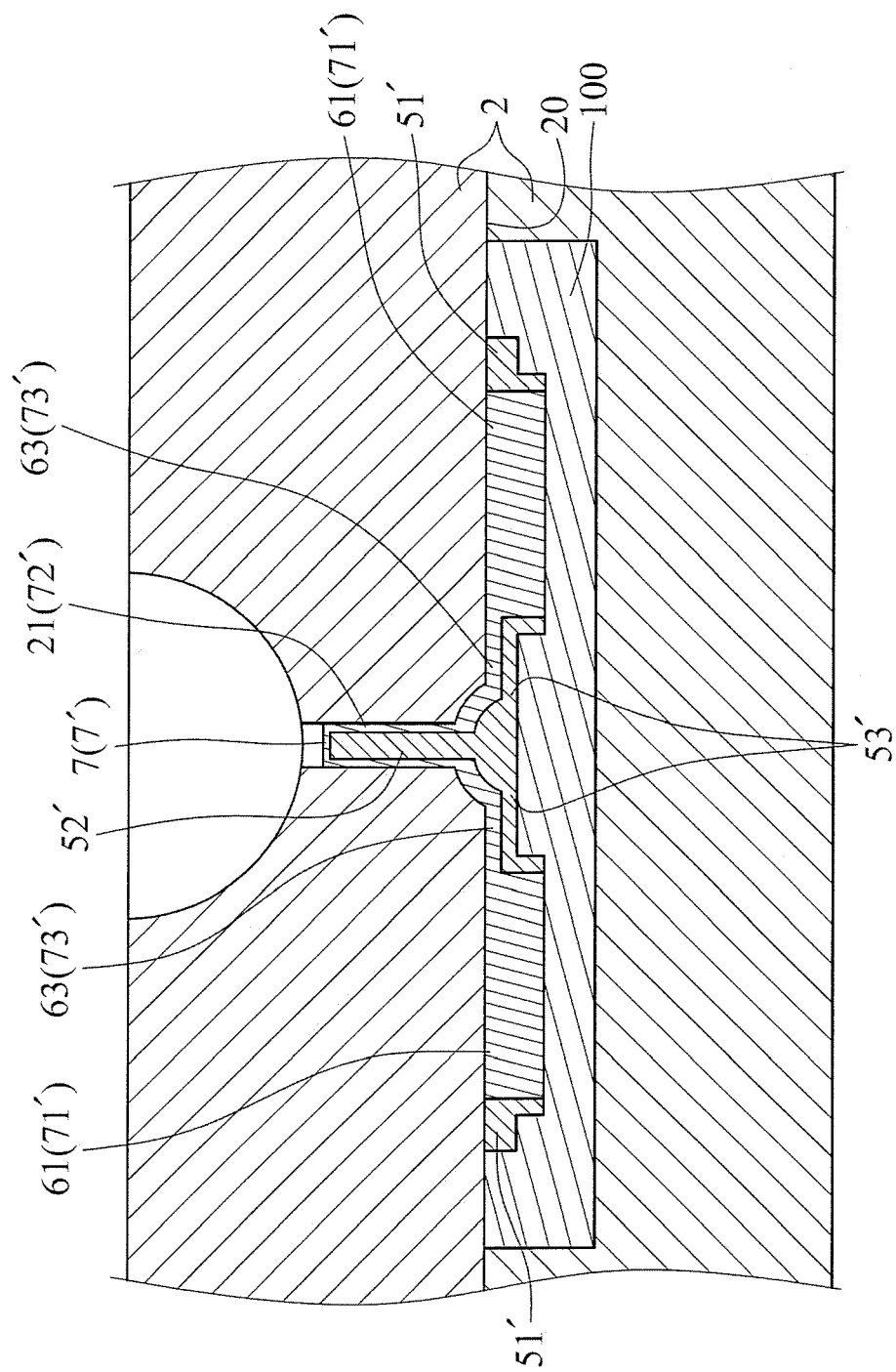
FIG. 9 is a sectional view of the first preferred embodiment, illustrating a second plastic material filled into the second molding cavities from a second down sprue of the second mold set via the second gates, so as to form a second molded object.
Figure 10:
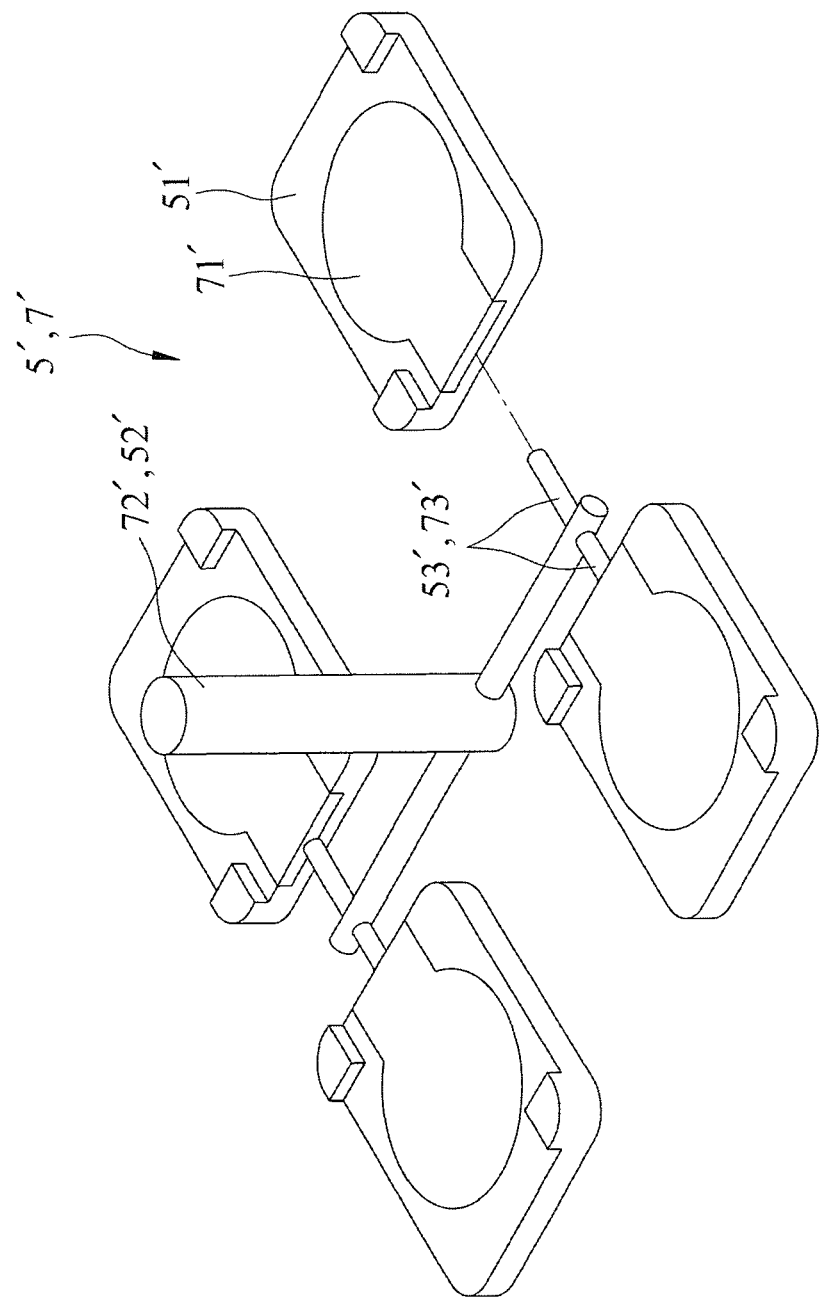
FIG. 10 is a perspective view of the first preferred embodiment, illustrating that first molded elements of the first molded object are coupled respectively to second molded elements of the second molded object.
Figure 11:
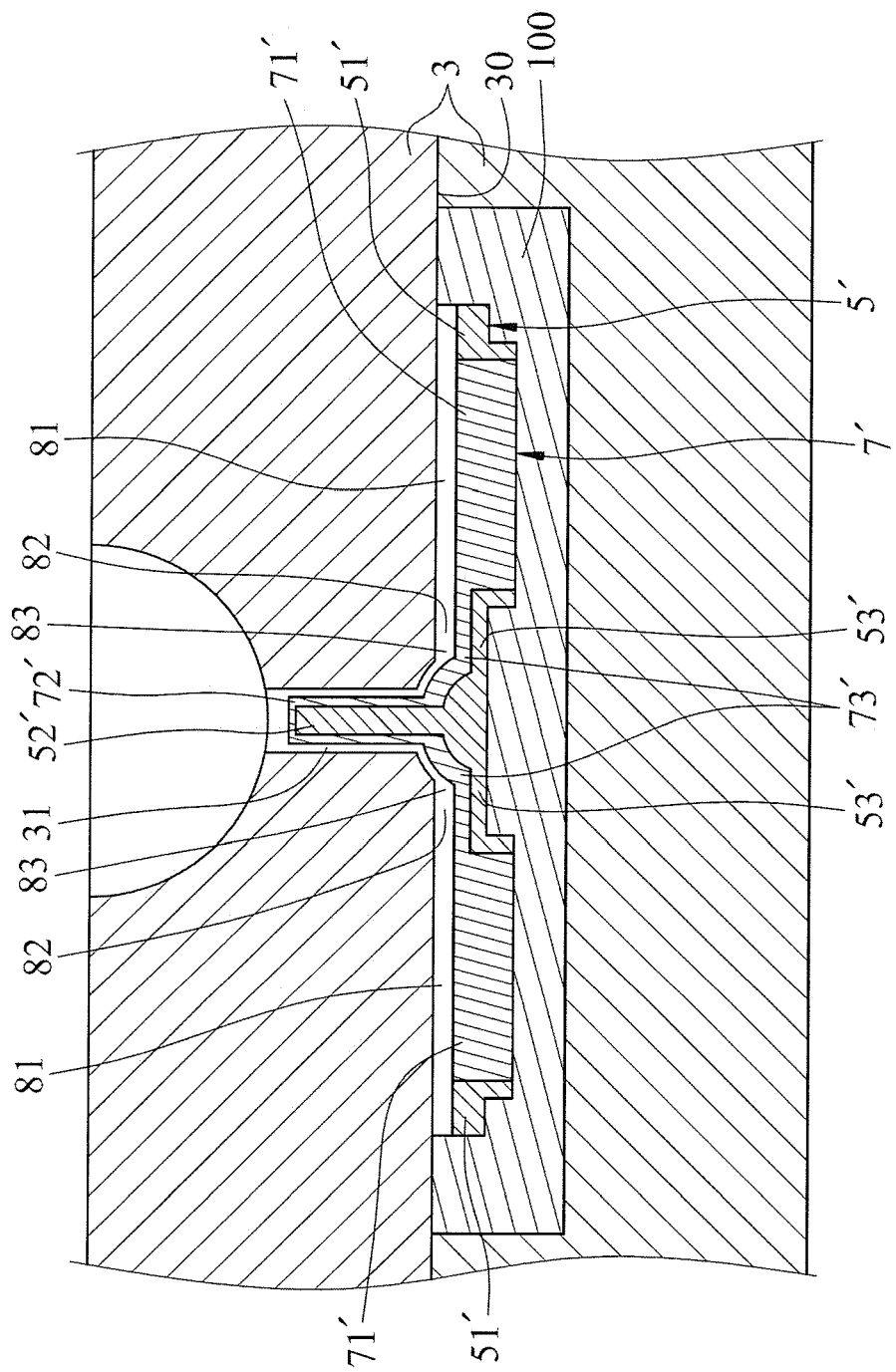
FIG. 11 is a sectional view of the second preferred embodiment, illustrating the inner mold member, the first and second molded objects and a third mold set cooperating to define a plurality of third molding cavities and a plurality of third gates.

Step (d): filling a second plastic material 7 into the second molding cavities 61 via the second down sprue 21, the second sprue channels 63 and the second gates 62, so as to form a second molded object 7' (see FIG. 9). The second molded object 7' includes a plurality of second molded elements 71' that are formed respectively in the second molding cavities 61 and that are coupled respectively to the first molded elements 51' of the first molded object 5' (e.g., encapsulating or being connected to the first molded element 51'), a main stem piece 72' formed in the second down sprue 21, and a plurality of branch stem pieces 73' respectively formed in the second sprue channels 63.

Step (e): disconnecting the first molded elements 51' and the second molded elements 71' respectively from the branch stem pieces 53' of the first molded object 5' and the branch stem pieces 73' of the second molded object 7' (see FIG. 10), followed by trimming cutting sites of the first and second molded elements so as to form the optical devices. In this embodiment, the first molded elements 51' and the second molded elements 71' are cut simultaneously and respectively from the first and second molded objects 5', 7'.

Since the first molded object 5' is placed into the second mold set 2 together with the inner mold member 100, alignment of the first molded element 51' in the second mold set 2 can be omitted due to the coupling relationship between the first molded object 5' and the inner mold member 100, so as to improve manufacturing efficiency of the optical device. In addition, the first molded elements 51' and the second molded elements 71' can be cut simultaneously and respectively from the first and second molded objects 5', 7', so that there is no need to perform the cutting step for first molded element 51' prior to the step of forming the second molded object 7', and the manufacturing efficiency can be improved accordingly.

Referring to FIGS. 2, and 11 to 13 and further referring back to FIGS. 3 to 9, the second preferred embodiment of the method for producing the optical device, is shown to include the following steps:

Step (a): providing a first mold set 1 and an inner mold member 100 (see FIGS. 3 to 6). The inner mold member 100 is disposed in the first mold set 1 and cooperates with the first mold set 1 to define a first molding cavity 41 and a first gate 42 spatially communicating with the first molding cavity 41. The first mold set 1 is formed with a first down sprue 11 that extends in a direction perpendicular to a parting plane 10 thereof, and further cooperates with the inner mold member 100 to define a first sprue channel 43 that spatially interconnects the first down sprue 11 and the first gate 42. In this embodiment, the inner mold member 100 and the first mold set 1 cooperatively define a plurality of the first molding cavities 41, a plurality of the first gates 42 spatially communicating with the first molding cavities 41 respectively, and a plurality of the first sprue channels 43 each of which spatially interconnects the first down sprue 11 and a respective one of the first gates 42. It should be noted that the number of the first molding cavities 41, of the first gates 42, or of the first sprue channels 43 should not be limited thereto according to the present invention.

Step (b): filling a first plastic material 5 into the first molding cavities 41 via the first down sprue 11, the first sprue channels 43, and the first gates 42 so as to form a first molded object 5' (see FIG. 7). The first molded object 5' includes a plurality of first molded elements 51' disposed respectively in the first molding cavities 41, a main stem piece 52' formed in the first down sprue 11, and a plurality of branch stem pieces 53' that are connected to the main stem piece 52' and that are formed respectively in the first sprue channels 43.

Figure 8:
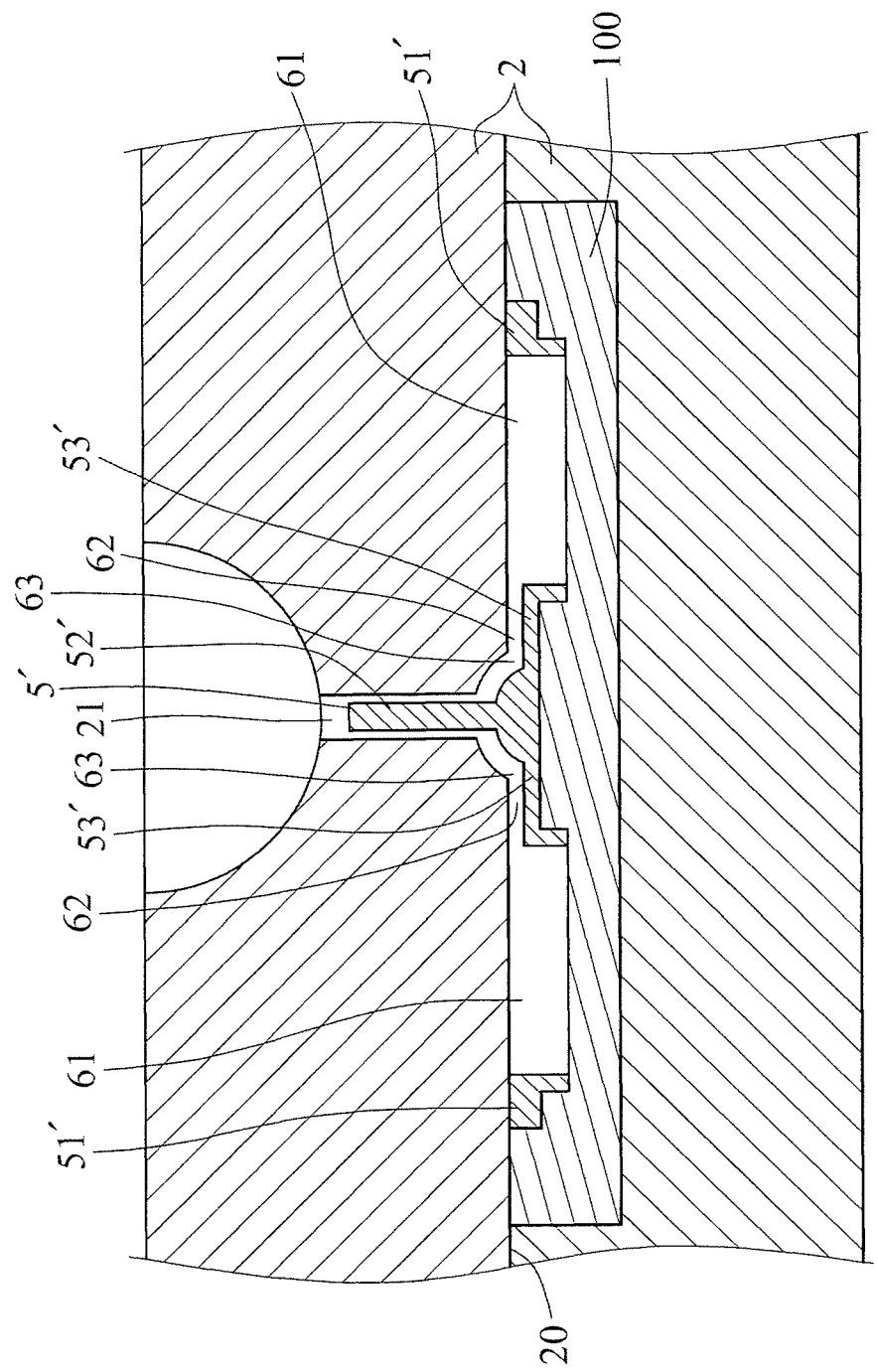
FIG. 8 is a sectional view of the first preferred embodiment, illustrating the inner mold member, the first molded object and the second mold set cooperating to define a plurality of second molding cavities and a plurality of second gates.

Step (c): providing a second mold set 2 and placing the inner mold member 100 together with the first molded object 5' into the second mold set 2 (see FIG. 8). The second mold set 2 is formed with a second down sprue 21 extending in a direction perpendicular to a parting plane 20 thereof. The inner mold member 100, the first molded object 5', and the second mold set 2 cooperatively define a plurality of second molding cavities 61 and a plurality of second gates 62 spatially communicating respectively with the second molding cavities 61. In this embodiment, the second mold set 2, the inner mold member 100 and the branch stem pieces 53' cooperate to define a plurality of second sprue channels 63, each of which interconnects the second down sprue 21 and a respective one of the second gates 62.

Step (d): filling a second plastic material 7 into the second molding cavities 61 via the second down sprue 21, the second sprue channels 63 and the second gates 62, so as to form a second molded object 7' (see FIG. 9). The second molded object 7' includes a plurality of second molded elements 71' that are formed respectively in the second molding cavities 61 and that are coupled respectively to the first molded elements 51' of the first molded object 5' (e.g., encapsulating or being connected to the first molded elements 51' respectively), a main stem piece 72' formed in the second down sprue 21, and a plurality of branch stem pieces 73' respectively formed in the second sprue channels 63 and interconnecting the main stem piece 72' and the second molded elements 71'.

Step (e): providing a third mold set 3 (see FIG. 11), followed by placing the inner mold member 100 together with the first molded object 5' and the second molded object 7' into the third mold set 3. The third mold set 3 is formed with a third down sprue 31 extending in a direction perpendicular to a parting plane 30 thereof. The inner mold member 100, the first molded elements 51' of the first molded object 5', the second molded elements 71' of the second molded object 7', and the third mold set 3 cooperate to define a plurality of third molding cavities 81 and a plurality of third gates 82 spatially communicating with the third molding cavities 81 respectively. In this embodiment, the third mold set 3, the inner mold member 100, and the branch stem pieces 73' of the second molded object 7' cooperatively define a plurality of third sprue channels 83 each of which interconnects spatially a respective one of the third gates 82 and the third down sprue 31.

Figure 12:
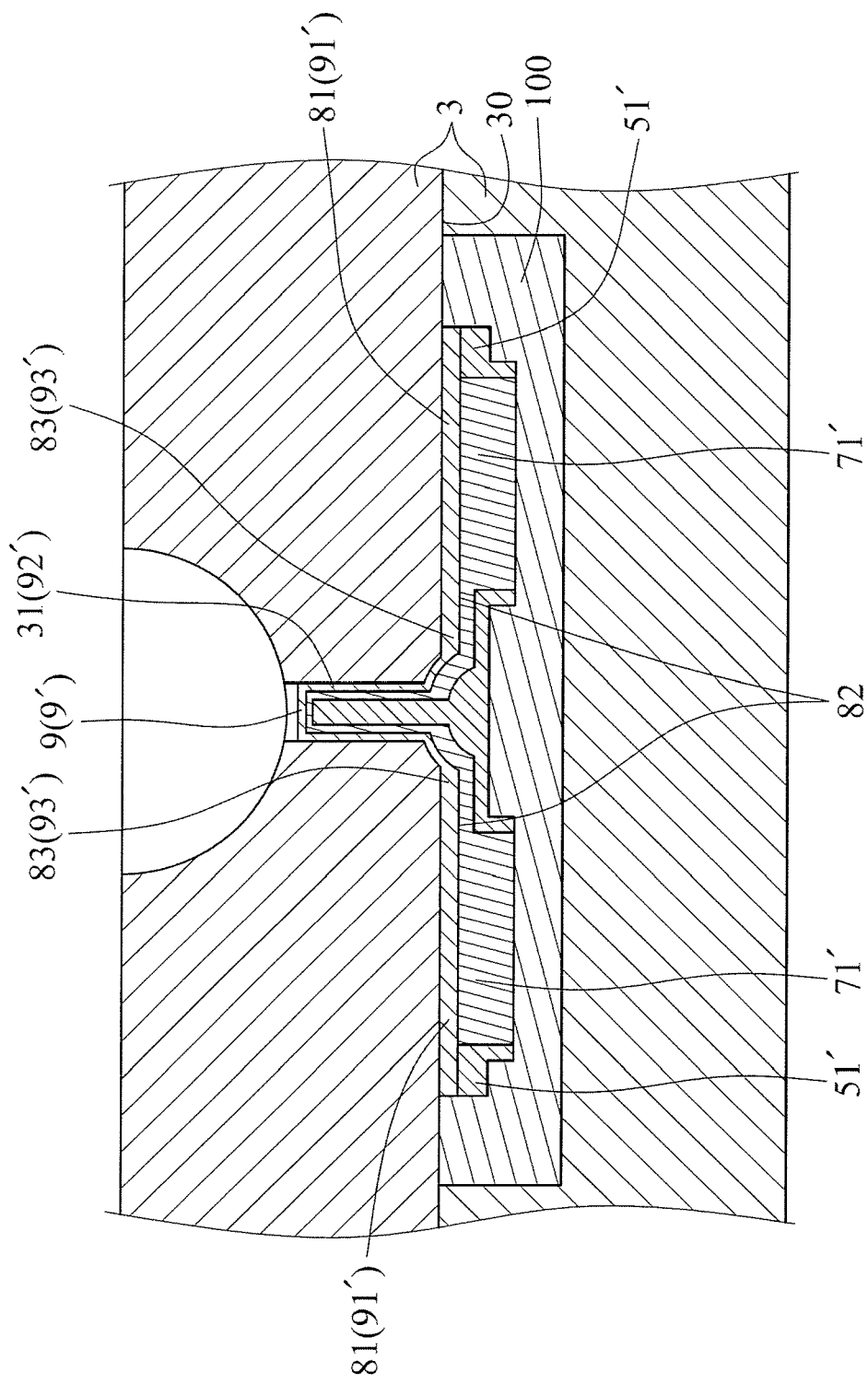
FIG. 12 is a sectional view of the second preferred embodiment, illustrating that a third plastic material is filled into the third molding cavities from a third down sprue via the third gates so as to form a third molded object.

Step (f): filling a third plastic material 9 into the third molding cavities 81 via the third down sprue 31, the third sprue channels 83 and the third gates 82 so as to form a third molded object 9' (see FIG. 12). The third molded object 9' includes a plurality of third molded elements 91' that are formed respectively in the third molding cavities 81 and that are coupled to the first molded elements 51' of the first molded object 5' and the second molded elements 71' of the second molded object 7' (e.g., by encapsulating or adhering to the first and second molded elements 51', 71'), a main stem piece 92' formed in the third down sprue 31, and a plurality of branch stem pieces 93' each of which is formed in a respective one of the third sprue channels 83 and interconnects a respective one of the third molded elements 91' and the main stem piece 92'.

Figure 13:
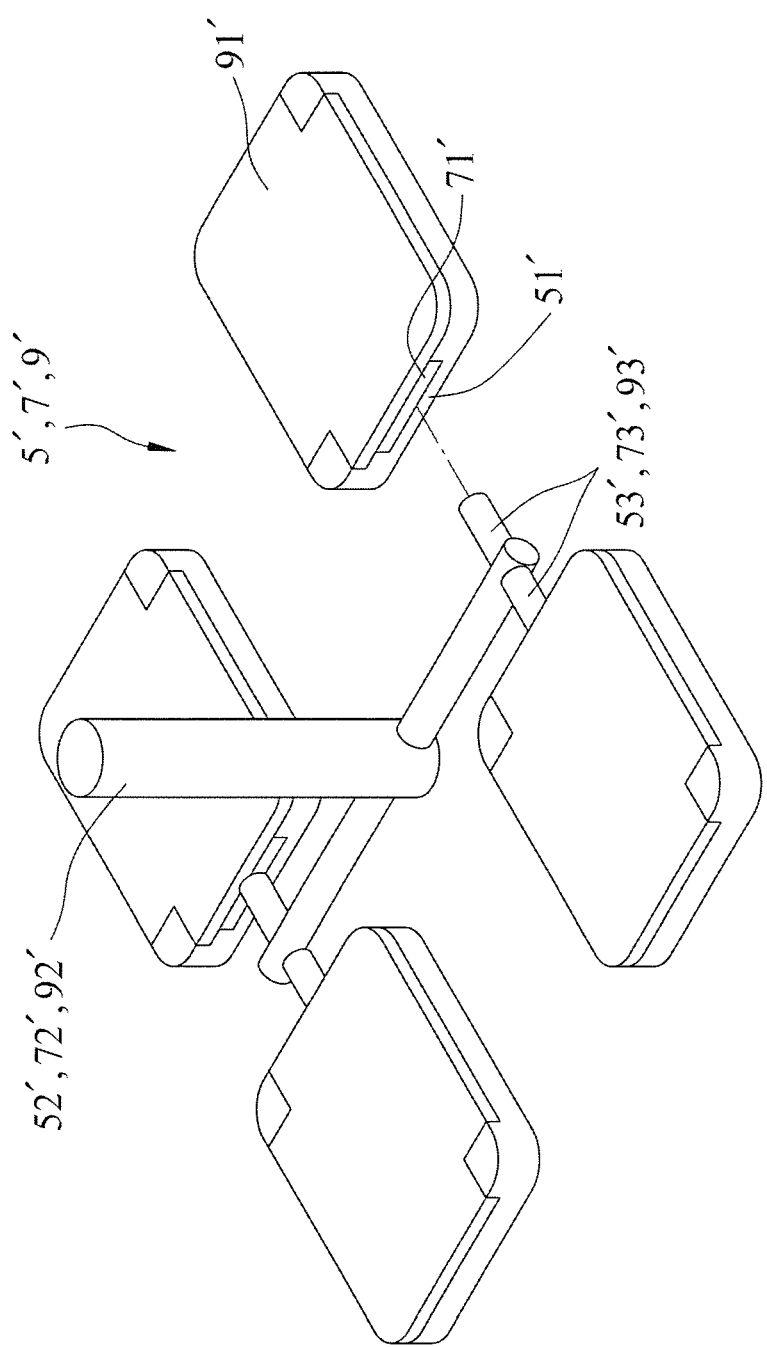
FIG. 13 is a perspective view of the second preferred embodiment, illustrating that third molded elements of the third molded object are coupled respectively to the first molded elements of the first molded object and respectively to the second molded elements of the second molded object.

Step (g): disconnecting the first molded elements 51', the second molded elements 71', and the third molded elements 91' respectively from the first molded object 5', the second molded object 7' and the third molded object 9' (see FIG. 13). In this embodiment, the first, second and third molded elements 51', 71', 91' are cut simultaneously and respectively from the branch stem pieces 52', 72', 92' of the first, second and third molded objects 5', 7', 9', followed by trimming cutting edges generated therefrom so as to obtain the optical devices. The second preferred embodiment has the same advantages as those of the first preferred embodiment.

Figure 14:
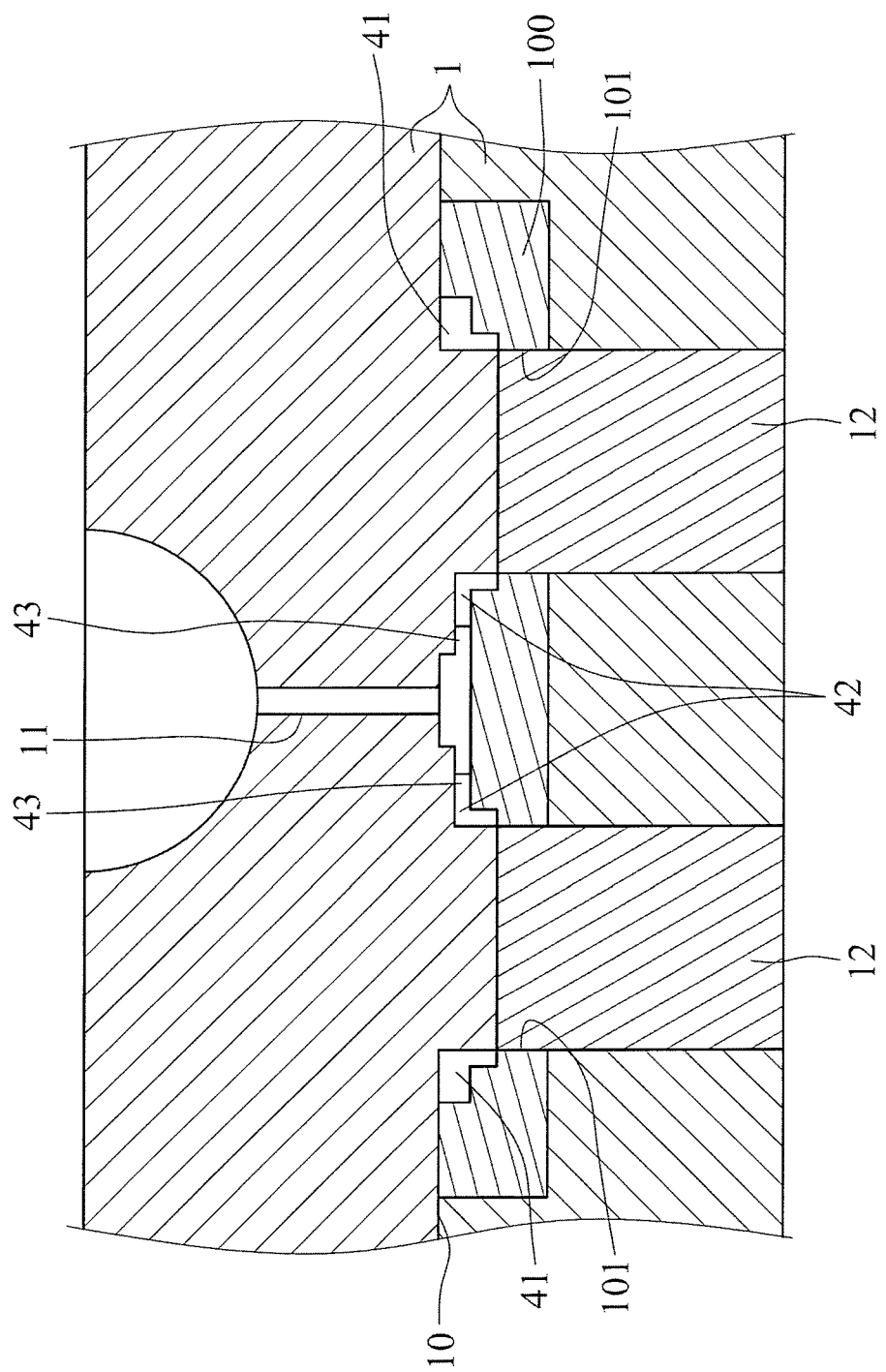
FIG. 14 is a sectional view of a third preferred embodiment according to the present invention, illustrating that the inner mold member and the first mold set cooperate to define the first molding cavities and the first gates.
Figure 15:
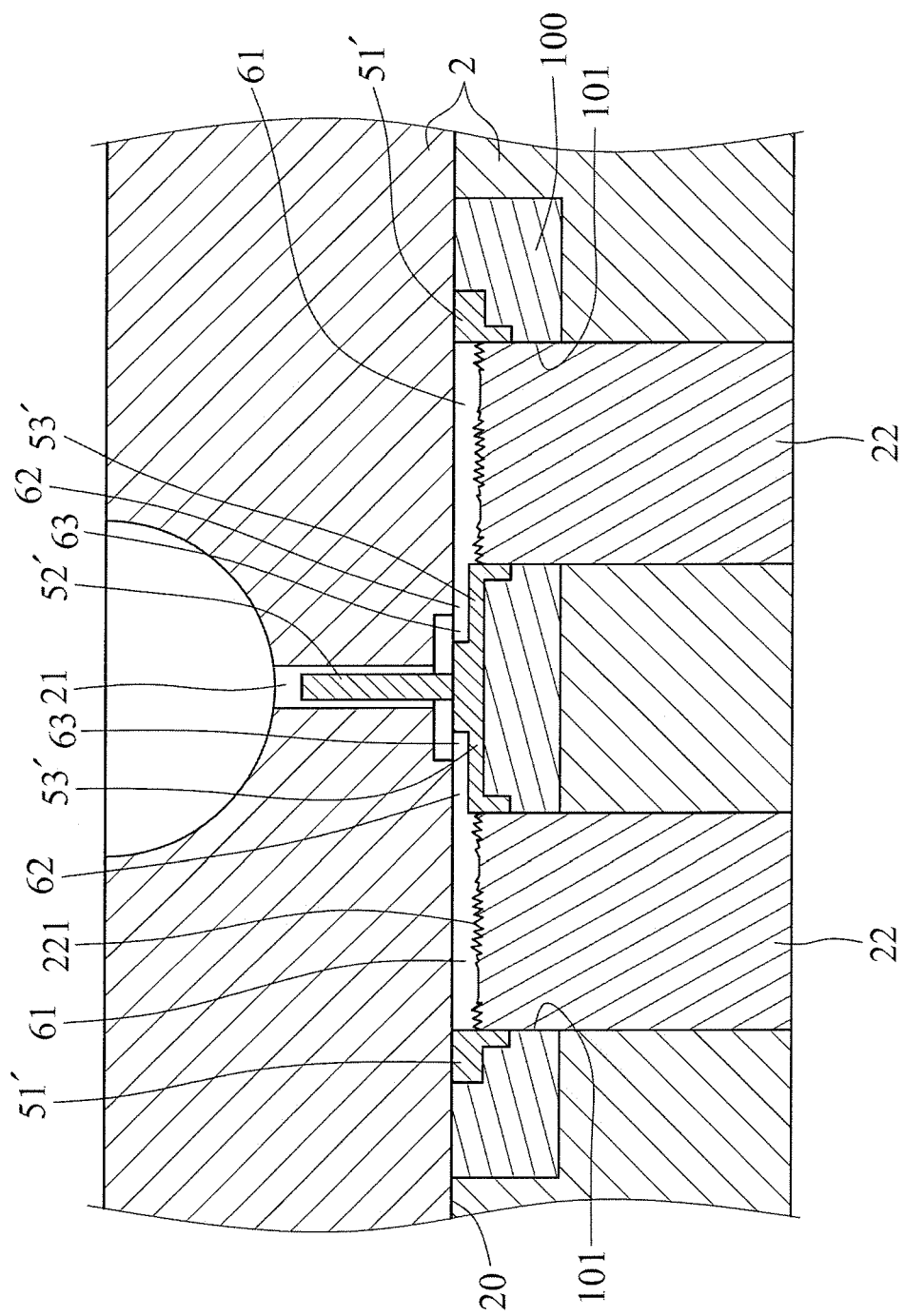
FIG. 15 is a sectional view of the third preferred embodiment, illustrating that the inner mold member and the second mold set cooperate to define the second molding cavities and the second gates.

Referring to FIGS. 14 and 15, the third preferred embodiment of the method according to the present invention is similar to that of the first preferred embodiment. The differences therebetween are as follows:

In step (a), the first mold set 1 includes a plurality of first cores 12, and the inner mold member 100 is formed with a plurality of holes 101 respectively receiving the first cores 12 (see FIG. 14).

In step (c), the second mold set 2 includes a plurality of second cores 22 each of which has a molding surface provided with a pattern 221, and the holes 101 of the inner mold member 100 receive respectively the second cores 22 of the second mold set 2.

In step (d), the second molded object 7' is light-transmissive. A surface of each of the second molded elements 71', which abuts against the molding surface of a respective one of the second cores 22, is formed with a pattern that corresponds to the pattern 221 of the respective one of the second cores 22, and that allows the optical device to have a refractive power according thereto. The third preferred embodiment has the same advantages as those of the first preferred embodiment.

To sum up, the method for producing the optical device according to the present invention is not only suited for an optical device including two elements that have various configurations or are made of various materials (such as the first preferred embodiment), but is also suited for an optical device including three elements like the second preferred embodiment. In addition, alignment of the first molded element 51' in the second mold set 2 can be omitted due to the coupling relationship between the first molded object 5' and the inner mold member 100, so as to improve manufacturing efficiency of the optical device. Furthermore, the first molded elements 51' and the second molded elements 71' can be cut simultaneously and respectively from the first and second molded objects 5', 7', so that there is no need to perform the cutting step for the first molded element 51' prior to the step of forming the second molded object 7'. Thus, the manufacturing efficiency can also be improved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for producing an optical device, comprising the following steps of:
   (a) providing a first mold set, a second mold set, and an inner mold member that is disposed in the first mold set and that cooperates with the first mold set to define a first molding cavity and a first gate spatially communicating with the first molding cavity;
   (b) filling a first plastic material into the first molding cavity via the first gate so as to form a first molded object including a first molded element;
   (c) placing the first molded object together with the inner mold member into the second mold set, such that the inner mold member, the first molded object, and the second mold set cooperatively define a second molding cavity and a second gate spatially communicating with the second molding cavity;
   (d) filling a second plastic material into the second molding cavity via the second gate so as to form a second molded object including a second molded element which is coupled to the first molded element; and
   (e) disconnecting the first molded element from the first molded object and disconnecting the second molded element from the second molded object so as to form the optical device.

2. The method according to claim 1, wherein:
   in step (a), the first and second mold sets are respectively formed with first and second down sprues, the first mold set further cooperating with the inner mold member to define a first sprue channel that spatially interconnects the first down sprue and the first gate;
   in step (b), the first plastic material is filled into the first molding cavity via the first down sprue, the first sprue channel, and the first gate, and the first molded object further includes a main stem piece that is formed in the first down sprue, and a branch stem piece that is connected to the main stem piece and that is formed in the first spure channel;
   in step (c), the second mold set, the inner mold member, and the branch stem piece of the first molded object cooperate to define a second sprue channel that spatially interconnects the second down sprue and the second gate, the main stem piece of the first molded object being disposed in the second down sprue; and
   in step (d), the second plastic material is filled into the second molding cavity via the second down sprue, the second sprue channel, and the second gate, and the second molded object further includes a main stein piece formed in the second down sprue, and a branch stem piece that is connected to the main stem piece of the second molded object and that is formed in the second sprue channel.

3. The method according to claim 1, wherein:
   in step (a), the first mold set includes a first core, the inner mold member including a hole receiving the first core of the first mold set;
   in step (c), the second mold set includes a second core having a molding surface provided with a pattern, the hole of the inner mold member receiving the second core of the second mold set; and
   in step (d), the second molded object is light-transmissive, and a surface of the second molded element that abuts against the molding surface of the second core has a refractive power and is formed with a pattern that corresponds to the pattern of the second core.

4. The method according to claim 1, wherein:
   in step (b), the first molded object includes a plurality of the first molded elements; and
   in step (d), the second molded object includes a plurality of the second molded elements that correspond in position respectively to the first molded elements and that are coupled respectively to the first molded elements of the first molded object to fonn a plurality of the optical devices.

5. The method according to claim 4, wherein:
   in step (a), the first mold set includes a plurality of first cores, the inner mold member including a plurality of holes receiving respectively the first cores of the first mold set;
   in step (c), the second mold set includes a plurality of second cores each of which has a molding surface provided with a pattern, the holes of the inner mold member receiving respectively the second cores of the second mold set; and
   in step (d), the second molded object is light-transmissive, and a surface of each of the second molded elements that abuts against the molding surface of a respective one of the second cores has a refractive power and is formed with a pattern that corresponds to the pattern of the respective one of the second cores.

6. The method according to claim 1, wherein, in step (e), the first and second molded elements are disconnected simultaneously and respectively from the first and second molded objects.

7. A method for producing an optical device, the method comprising the steps of:
   (a) providing a first mold set, a second mold set, a third mold set, and an inner mold member that is disposed in the first mold set and that cooperates with the first mold set to define a first molding cavity and a first gate spatially communicating with the first molding cavity;
   (b) filling a first plastic material into the first molding cavity via the first gate so as to form a first molded object including a first molded element;
   (c) placing the first molded object together with the inner mold member into the second mold set, such that the inner mold member, the first molded object, and the second mold set cooperate to define a second molding cavity and a second gate spatially communicating with the second molding cavity;
   (d) filling a second plastic material into the second molding cavity via the second gate so as to form a second molded object including a second molded element which is coupled to the first molded element;
   (e) placing the inner mold member together with the first molded object and the second molded object into the third mold set, such that the inner mold member, the first and second molded objects, and the third mold set cooperate to define a third molding cavity and a third gate that is in spatial communication with the third molding cavity;
   (f) filling a third plastic material into the third molding cavity via the third gate, so as to form a third molded object including a third molded element which is coupled to at least one of the first and second molded elements; and
   (g) disconnecting the first molded element from the first molded object, disconnecting the second molded element from the second molded object, and disconnecting the third molded element from the third molded object so as to form the optical device.

8. The method according to claim 7, wherein:
in step (a), the first, second and third mold sets are respectively formed with first, second and third down sprues, and the inner mold member and the first mold set further cooperatively define a first sprue channel that spatially interconnects the first down sprue and the first gate;
in step (b), the first plastic material is filled into the first molding cavity via the first down sprue, the first sprue channel, and the first gate so as to form the first molded object, the first molded object further including a main stem piece formed in the first down sprue, and a branch stem piece connected to the main stem piece and formed in the first sprue channel;
in step (c), the second mold set, the inner mold member and the branch stem piece of the first molded object further define cooperatively a second sprue channel that spatially interconnects the second down sprue and the second gate, the main stem piece of the first molded object being disposed in the second down sprue of the second mold set;
in step (d), the second plastic material is filled into the second molding cavity via the second down sprue, the second sprue channel, and the second gate so as to form the second molded object, the second molded object further including a main stem piece formed in the second down sprue, and a branch stem piece that is connected to the main stem piece of the second molded object and that is formed in the second sprue channel;
in step (e), the third mold set, the inner mold member, and the branch stem piece of the second molded object further define cooperatively a third sprue channel that spatially interconnects the third down sprue and the third gate, and the main stem piece of the second object is disposed in the third down sprue; and
in step (f), the third plastic material is filled into the third molding cavity via the third down sprue, the third sprue channel and the third gate, so as to form the third molded object, the third molded object further including a main stem piece formed in the third down sprue, and a branch stem piece that is connected to the main stem piece of the third molded object and that is formed in the third sprue channel.

9. The method according to claim 7, wherein, in step (g), the first, second, and third molded elements are simultaneously disconnected from the first, second and third molded objects, respectively.

* * * * *